Oct. 1, 1940.  W. L. KAUFFMAN, 2D  2,216,396
WRINGER AND THE LIKE
Filed Oct. 7, 1938
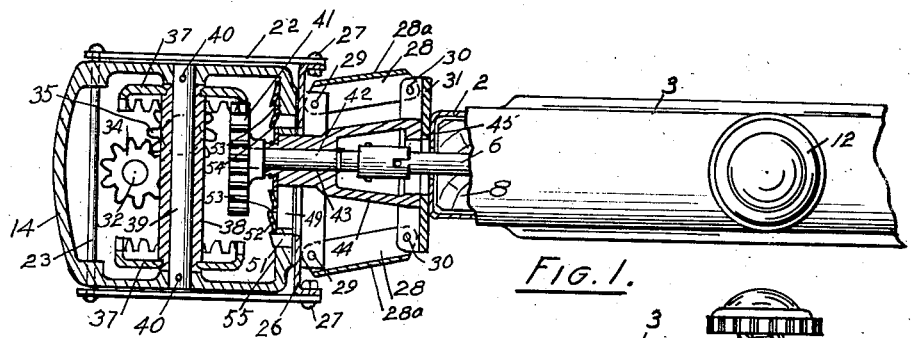
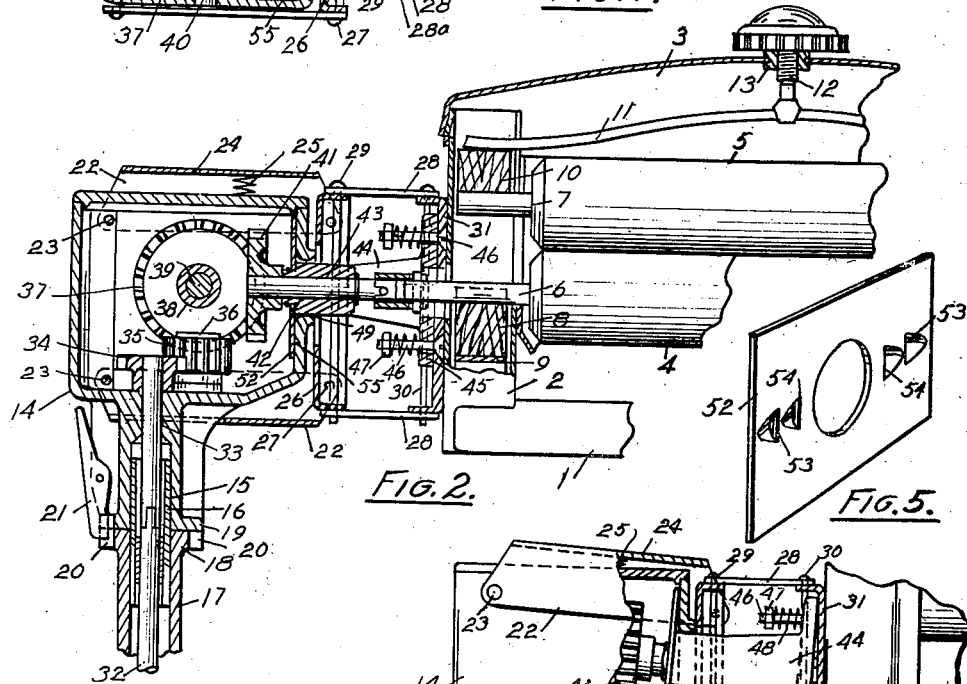
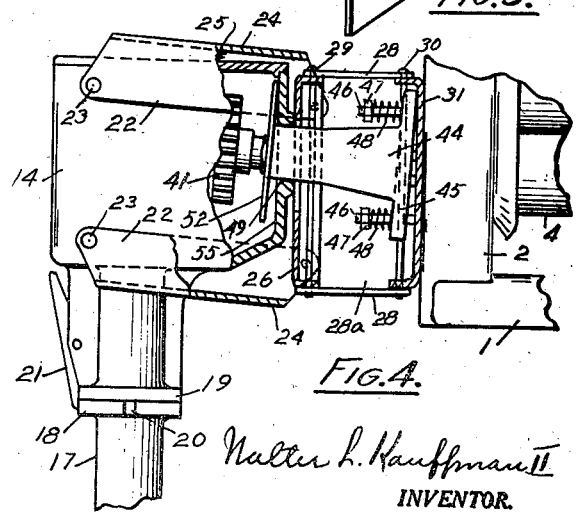
Walter L. Kauffman II
INVENTOR.
BY
ATTORNEYS.

Patented Oct. 1, 1940

2,216,396

UNITED STATES PATENT OFFICE 2,216,396

WRINGER AND THE LIKE

Walter L. Kauffman, II, Erie, Pa., assignor to Lovell Manufacturing Company, Erie, Pa., a corporation of Pennsylvania Application October 7, 1938, Serial No. 233,834

6 Claims. (Cl. 68—269)

Wringers and like devices comprising pressure rolls subject the operator to some hazard due to the possibility of becoming caught between the rolls. In order to relieve the operator, different methods are employed to accomplish the relief, one of which is to stop the rotation of the rolls, or to reverse the same. The invention as exemplified in the present structure is designed to effect a release by stopping or reversing the rolls. It will be understood that when the operator becomes caught in the rolls, that panic conditions exist, and in order that a relief may be more certainly accomplished, it is desirable that a relief operation be in response to the instinctive action of the operator so caught. The present invention is designed to effect this result. In order to more definitely effect this response, the mechanism is formed to operate with a movement of the wringer up and down and forward and back, or a combination of these movements, and also the mechanism is so formed that the wringer responds in movement equally to a pull or thrust through the length of the wringer.

Features and details of the invention will appear from the specification and claims.

In the preferred embodiment illustrated, the invention is shown as a wringer, as follows:

Fig. 1 shows a plan view partly in section, of a wringer.

Fig. 2 an elevation partly in section.

Fig. 3 shows a view similar to Fig. 1 but with the gear parts in the act of reversal through a horizontal movement of the wringer.

Fig. 4 a front elevation, partly in section, showing the gear mechanism in the act of reversal from a downward thrust of the wringer.

Fig. 5 a perspective view of a locking plate for locking the gear mechanism in adjusted positions.

1 marks the base of the wringer frame; 2 the side stiles (one only being shown); 3 the top bar of the wringer; 4 the lower wringer roll; 5 the upper wringer roll; 6 and 7 the shafts for the lower and upper rolls respectively; 8 bearings for the lower shaft; 9 brackets for supporting the bearings; 10 bearings for the upper shaft, the bearings 10 being slidingly mounted in the stiles; 11 a pressure spring operating on the upper bearing; 12 an adjusting screw for the spring; 13 a nut in which the screw operates, said nut being fixed in the top bar. These parts are or may be of common construction.

A head 14 is provided with a swivel socket 15, which is swiveled on a post extension 16, said extension being formed on the post 17. The post has a flange 18 at its upper end on which a flange 19 of the head extends. The flange 18 has a number of index notches and a latch 21 pivoted on the head operates in these notches. The latch when released allows the movement of the wringer to different positions and when the latch is in locking position, locks it in adjusted position. Vertically swinging links 22 are pivotally connected to the head by pins 23. The links at each side of the head are connected by plates 24, and a spring 25 yieldingly holds the links in horizontal position under the weight of the wringer. The inner ends of the links are connected to a floating carrier plate 26 by means of pivot pins 27. Horizontally swinging links 28 are connected to the floating plate 26 by pins 29 and by pins 30 pivotally connected to the plate 31, which is secured to the face of the stile. The links 28 at opposite sides are connected by cross plates 28a. With this linkage, the wringer may be moved forward and back through the movement of the links 28 or may be moved up and down through the movement of the links 22, but in whatever position it is moved, it maintains its parallel relation to any other adjustment, and the movement of the wringer throughout is uniform.

A drive shaft 32 extends upwardly through the post from a source of power in the usual manner and is journaled in the bearing 33 in the head. A gear 34 is fixed on the upper end of the shaft 32. The gear 34 meshes with the gear 35, journaled on a stud 36 fixed in the head. The gear 35 meshes with one of two reversing gears 37 which are fixed on a sleeve 38, the sleeve 38 being journaled on a pin 39 extending across the head and fixed therein by pins 40.

A driven gear 41 is arranged between the reversing gears. It is carried by a shaft 42, the shaft 42 being journaled in a bearing 43. The bearing 43 is mounted on a tilting post 44. This post has a base 45 resting against the plate 31. It is secured on the plate by screws 46, the screws having nuts 47; and outer springs 48 are arranged around the screws between the nuts 47 and the base 45. Thus the base is yieldingly held against the plate 31, but may be tilted in any direction permitting the tilting of the post 44 and bearing 43. The bearing slides horizontally through a slot 49 in the head, the slot giving freedom of movement for the tilting action, up and down as well as crosswise. When the wringer is moved forward or back, this carries the driven gear 41 into mesh with one or the other of the reversing gears. A flexible coupling connects the shaft 42 with the shaft 6 and permits the deflection and offsetting of the shaft 42 with relation to the shaft 6.

In order to lock the gear in set position, locking pins 51 are arranged at each side of the slot 49. These pins have inclined ends and stop faces toward the center. The locking plate 52 is fixed on the end of the bearing 43. It is provided with stabbings which form inclined faces corresponding to the faces 51, and shoulders 53 and 54 which are adapted to engage the inner faces of the pins. With the wringer in central or neutral position, the plate 52 will rest against the face of the wall 55 of the head with the shoulders 53 in engagement with the pins 51. If the wringer is moved horizontally the movement of the wringer is accommodated by the tilting of the post 44, the bearing 43, and consequently the plate 52. This tilting lifts the far end of the plate so as to disengage the shoulders and this permits the gear to snap forward into engagement with the reversing gear in the position shown in Fig. 1. This position is the one in which the rear pin engages its shoulder 54 and the end of the plate engages the forward pin, thus locking the gear in set position and yieldingly holding the wringer in that position. Should the operator become caught and pull the wringer forward this would result in a tilting of the post 44, bearing 43, and plate 52 and this would lift the end of the plate free from the forward pin. The gear would then snap forward until it was in line with the wringer and then the shoulders 53 would be brought into engagement with the pins and hold the wringer in neutral position. The continued movement of the wringer forward simply reverses the tilting action so as to snap the gear 41 into mesh with the forward reversing gear so as to reverse the movement of the wringer.

In Fig. 3 the wringer is shown as being moved to the neutral position and the parts tilting to a position to release the gear just prior to their snapping movement to the center neutral position. Should the wringer be pulled upwardly or downwardly, the post 44, the bearing 43 and plate 52 would be tilted with the fulcrum in the top or bottom and this would result in an outward movement of the shoulders in engagement and permit the post to snap to neutral position, thus bringing the gear out of mesh. As soon as the upward pull or thrust on the wringer is relieved, the wringer is again brought to neutral position through the springs 25 and shoulders 53 put in engagement with the pins yieldingly locking the wringer in neutral position.

It will be noted that the gear thrust between the gears 37 and 41 tends to move the frame toward release position after the latch is unhooked. In this structure this is a yielding thrust but it assists the operator in continuing the release movement.

What I claim as new is:

1. In a wringer or the like having a frame; rolls comprising shafts mounted in the frame; and a supporting head for the frame; the combination with said head and frame of connections between the head and frame providing for vertical and horizontal movement of the frame; a driving mechanism comprising reversing gears spaced apart; a roll gear receivable in the space between the reversing gears and movable into mesh with either reversing gear; a gear shaft for the roll gear; a flexible connection between the gear shaft and the roll shaft; a yielding tilting bearing for the roll shaft carried by the frame; and latches releasable by the tilting of the bearing releasing the bearing and movement to throw the roll gear into and out of mesh.

2. In a wringer or the like having a frame; rolls comprising shafts mounted in the frame; and a supporting head for the frame; the combination with said head and frame of connections between the head and frame comprising horizontally swinging and vertically swinging links providing for vertical and horizontal movement of the frame; a driving mechanism comprising reversing gears spaced apart; a roll gear receivable in the space between the reversing gears and movable into mesh with either reversing gear; a gear shaft for the roll gear; a flexible connection between the gear shaft and the roll shaft; a yielding tilting bearing for the roll shaft carried by the frame; and latches releasable by the tilting of the bearing releasing the bearing and movement to throw the roll gear into and out of mesh.

3. In a wringer or the like having a frame; rolls comprising shafts mounted in the frame; and a supporting head for the frame; the combination with said head and frame of connections between the head and frame comprising horizontally swinging and vertically swinging links providing for vertical and horizontal movement of the frame; a driving mechanism comprising reversing gears spaced apart; a roll gear receivable in the space between the reversing gears and movable into mesh with either reversing gear; a gear shaft for the roll gear; a flexible connection between the gear shaft and the roll shaft; a yielding tilting bearing for the roll shaft carried by the frame; and latches releasable by the tilting of the bearing releasing the bearing and movement to throw the roll gear into and out of mesh, said latches locking the bearing against movement from thrust of the gear.

4. In a wringer or the like having a frame; rolls comprising shafts mounted in the frame; and a supporting head for the frame; the combination with said head and frame of connections between the head and frame providing for vertical and horizontal movement of the frame; a driving mechanism comprising reversing gears spaced apart; a roll gear receivable in the space between the reversing gears and movable into mesh with either reversing gear; a gear shaft for the roll gear; a flexible connection between the gear shaft and the roll shaft; a yielding tilting bearing for the roll shaft carried by the frame, said bearing being supported on the base plate resting on the wringer frame; springs yieldingly holding the base plate to the frame; a tilting plate having shoulders thereon; and latch pins engaging said shoulders and releasable through the tilting of said frame.

5. In a wringer or the like having a frame; rolls comprising shafts mounted in the frame; and a supporting head for the frame; the combination with said head and frame of connections between the head and frame providing for lateral movement of the frame; a driving mechanism comprising reversing gears spaced apart; a roll gear receivable in the space between the reversing gears and movable into mesh with either reversing gear; a gear shaft for the roll gear; a flexible connection between the gear shaft and the roll shaft; a yielding tilting bearing for the roll shaft carried by the frame; and latches releasable by the tilting of the bearing releasing the bearing and movement to throw the roll gear into and out of mesh.

6. In a wringer or the like having a frame; rolls comprising shafts mounted in the frame; and a supporting head for the frame; the combination with said head and frame of connections between the head and frame comprising paralleling links providing for a lateral movement of the frame; a driving mechanism comprising reversing gears spaced apart; a roll gear receivable in the space between the reversing gears and movable into mesh with either reversing gear; a gear shaft for the roll gear; a flexible connection between the gear shaft and the roll shaft; a yielding tilting bearing for the roll shaft carried by the frame; and latches releasable by the tilting of the bearing releasing the bearing and movement to throw the roll gear into and out of mesh.

WALTER L. KAUFFMAN, II.